(12) United States Patent
Sato

(10) Patent No.: US 11,041,991 B2
(45) Date of Patent: Jun. 22, 2021

(54) OPTICAL COMPONENT AND METHOD OF MANUFACTURING OPTICAL COMPONENT

(71) Applicant: Nippon Sheet Glass Company, Limited, Tokyo (JP)

(72) Inventor: Shiro Sato, Kanagawa (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 16/562,609

(22) Filed: Sep. 6, 2019

(65) Prior Publication Data

US 2019/0391337 A1 Dec. 26, 2019

Related U.S. Application Data

(63) Continuation of application No. PCT/JP2018/007560, filed on Feb. 28, 2018.

(30) Foreign Application Priority Data

Mar. 7, 2017 (JP) ............................. JP2017-042792

(51) Int. Cl.
*G02B 6/32* (2006.01)
*B29D 11/00* (2006.01)
*G02B 1/04* (2006.01)

(52) U.S. Cl.
CPC .......... *G02B 6/32* (2013.01); *B29D 11/00326* (2013.01); *B29D 11/00442* (2013.01); *G02B 1/041* (2013.01)

(58) Field of Classification Search
CPC .... G02B 6/32; G02B 1/041; B29D 11/00326; B29D 11/00442

USPC .......................................................... 385/33
See application file for complete search history.

(56) References Cited

U.S. PATENT DOCUMENTS

| | | | |
|---|---|---|---|
| 6,530,697 B1 | 3/2003 | Johnson et al. | |
| 6,730,459 B2 | 5/2004 | Nishikawa et al. | |
| 2004/0091218 A1 | 5/2004 | Haasteren | |
| 2008/0159695 A1* | 7/2008 | Kathman | G02B 6/29311 385/33 |
| 2010/0329605 A1 | 12/2010 | Graham | |
| 2014/0293426 A1* | 10/2014 | Dobschal | A61F 2/1632 359/574 |
| 2019/0339423 A1* | 11/2019 | Tsunetomo | G02B 3/08 |

FOREIGN PATENT DOCUMENTS

| | | | | |
|---|---|---|---|---|
| CN | 1711487 A | 12/2005 | | |
| CN | 101671354 A | 3/2010 | | |
| CN | 102192988 A | 9/2011 | | |
| CN | 102458807 A | 5/2012 | | |
| CN | 102574309 A | 7/2012 | | |
| CN | 105572794 A * | 5/2016 | ......... | G02B 6/02085 |

(Continued)

OTHER PUBLICATIONS

International Search Report dated Apr. 17, 2018, in International Application No. PCT/JP2018/007560.

(Continued)

*Primary Examiner* — Jerry M Blevins
(74) *Attorney, Agent, or Firm* — Sughrue Mion, PLLC

(57) ABSTRACT

An optical component includes: a substrate; a lens formed on a first principal surface of the substrate; and a vortex profile formed on a surface of the lens.

10 Claims, 16 Drawing Sheets

(56) References Cited

FOREIGN PATENT DOCUMENTS

| EP | 2778732 A1 | 9/2014 |
|---|---|---|
| JP | 2002277695 A | 9/2002 |
| JP | 2006512598 A | 4/2006 |
| JP | 2006178472 A | 7/2006 |
| JP | 2008046312 A | 2/2008 |
| JP | 2013080900 A | 5/2013 |
| JP | 2016091014 A | 5/2016 |

OTHER PUBLICATIONS

International Preliminary Report on Patentability with Translation of Written Opinion dated Sep. 10, 2019, in International Application No. PCT/JP2018/007560.
Communication dated Nov. 13, 2020, from the European Patent Office in application No. 18764878.7.
The State Intellectual Property Office of the P.R. of China Communication dated Aug. 5, 2020, issued in Application No. 201880016158.4.
Office Action dated Mar. 16, 2021 in Taiwanese Application No. 107107121.
Office Action dated Mar. 29, 2021 issued in the cooresponding Chinese Patent Application No. 201880016158.4.

\* cited by examiner

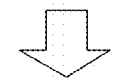

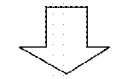

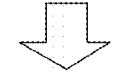

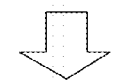

FIG. 12A
FIG. 12B
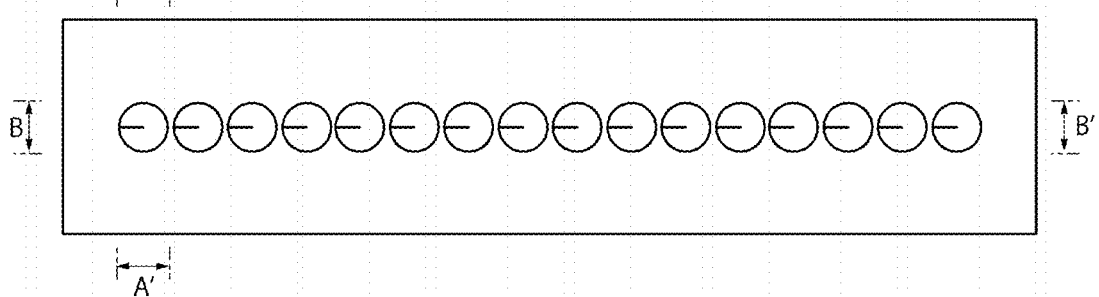
FIG. 12C
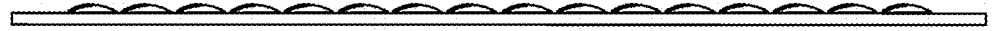
FIG. 12D
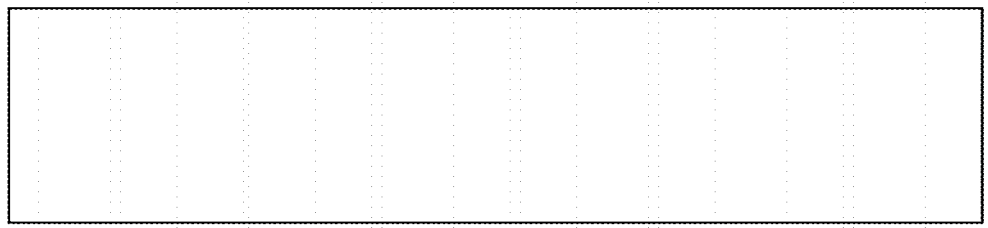
FIG. 12E          FIG. 12F
 

FIG. 15A
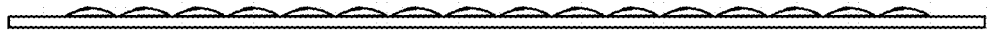
FIG. 15B
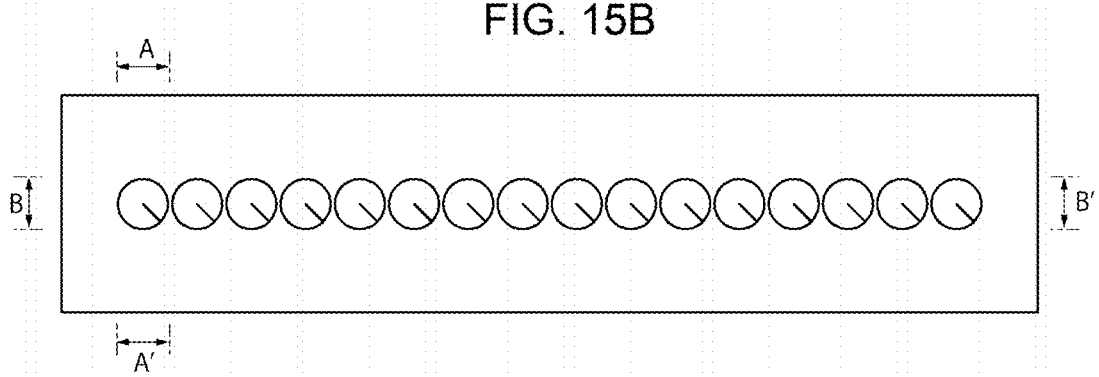
FIG. 15C
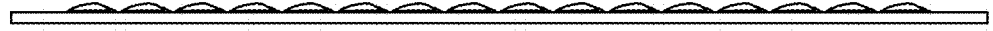
FIG. 15D
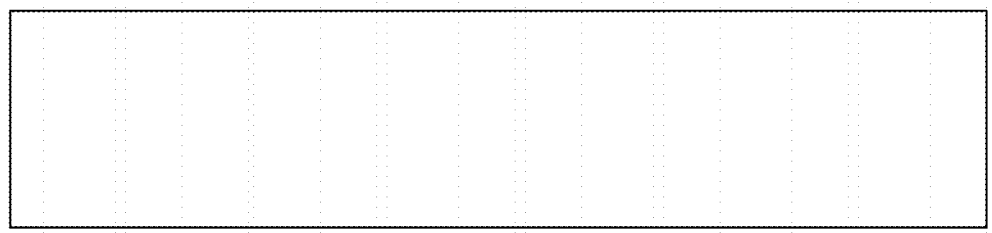
FIG. 15E  FIG. 15F
 

FIG. 18A
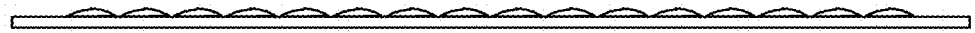
FIG. 18B
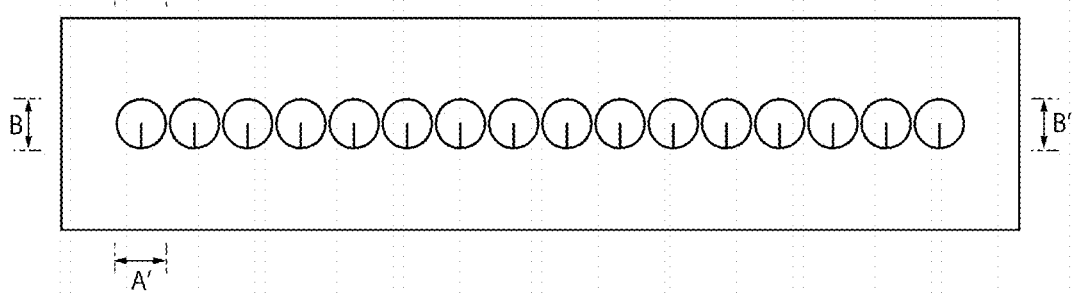
FIG. 18C
FIG. 18D
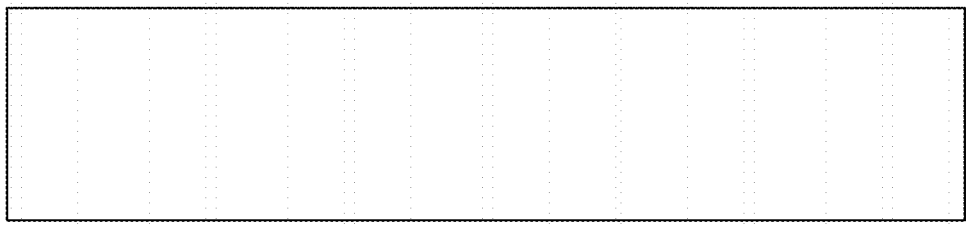
FIG. 18E     FIG. 18F
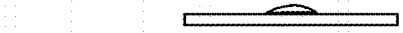 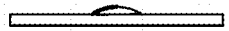

OPTICAL COMPONENT AND METHOD OF MANUFACTURING OPTICAL COMPONENT

BACKGROUND OF THE INVENTION

Field of the Invention

The present invention relates to optical components and a method of manufacturing optical components.

Background Art

The volume of data communication has increased explosively due to the widespread use of the Internet and cloud services. It has also become necessary to exchange a large volume of data at a high speed in a data center built to store data temporarily or to make Internet connections.

For short-range (10 m-1000 m) transmission such as that performed within a data center, optical communication is advantageous for the purpose of high-speed communication, although communication based on electrical signals is performed as well. Systems offering a transmission speed of several GHz-10 GHz built by a combination of a surface-emitting light source such as a vertical cavity surface emitting laser (VCSEL) and a multimode fiber have already been available for short-range optical communication.

Since a multimode fiber is designed such that the core where light travels is larger than that of a single-mode fiber, the light may be transmitted in a large number of modes within the core, producing differential modal dispersion (DMD). DMD degrades optical waveforms easily and so may restrict the transmission distance.

A method using a vortex phase plate for generating an optical vortex is known as a method for reducing DMD in a multimode fiber (e.g., patent reference 1 or 2). Normally, light emitted from a laser presents a basic Gaussian light intensity distribution in which the intensity at the center is higher. A light with Gaussian intensity transmitted through a vortex phase plate can be transformed into a light having a ring-shaped light intensity distribution in which the intensity at the center is zero or reduced. A vortex phase plate is an optical component shaped in a plate in which a continuous or step-like spiral profile (vortex profile) is formed on one of the principal surfaces.

As is well known, the refraction index distribution in the central part of the core of a multimode fiber may be unstable, depending on the manufacturing method. The instability could be a factor to cause DMD (e.g., patent reference 1 or 2). This is addressed by transmitting the light emitted from a laser through a vortex phase plate and transforming the light into a light having a ring-shaped light intensity distribution before causing the light to be incident on the multimode fiber. This inhibits the light from being directly incident on the central part of the core of the multimode fiber and causes the light to be propagated within the fiber mainly in a so-called high-order propagation mode. Therefore, the occurrence of DMD is inhibited.

[Patent literature 1] JP2008-46312
[Patent literature 2] JP2016-91014

SUMMARY OF THE INVENTION

However, provision of a vortex phase plate between a light source and a multimode fiber increases the number of optical components for which light axes should be aligned and may make light axis adjustment more difficult as compared with the case where a vortex phase plate is not provided. Adjustment may be even more difficult in an optical system of an array type in which there are a plurality of such combinations of optical components.

The embodiment addresses the above-described issue, and a purpose thereof is to provide a technology that makes light axis adjustment easy in an optical system designed to generate an optical vortex.

Means to Solve the Problem

An optical component according to an embodiment of the present invention includes: a substrate; a lens formed on a first principal surface of the substrate; and a vortex profile formed on a surface of the lens.

The optical component may further include: an optical device provided on a second principal surface of the substrate opposite to the first principal surface.

The optical device may be at least one of a lens, a polarizer, a wavelength plate, a phase plate, a prism, a diffraction grating, a filter, a mirror, a half mirror, a light emitting device, and a light receiving device.

A plurality of the lenses provided with the vortex profile may be arranged on the first principal surface of the substrate in an array pattern.

Another embodiment of the present invention relates to a method of manufacturing the aforementioned optical component. The method includes: dropping an photo-curable resin on a mold in which an inverted shape of the lens provided with the vortex profile is formed; stacking the substrate to the mold and spreading the photo-curable resin; irradiating the photo-curable resin with light to cure the photo-curable resin; and demolding the mold to retrieve the optical component.

Still another embodiment of the present invention also relates to a method of manufacturing the aforementioned optical component. The method includes: closing a fixed mold, on which a mold formed with an inverted shape of the lens provided with the vortex profile is mounted, and a movable mold, and then injecting a molding material into a space between the fixed mold and the movable mold; cooling and curing the molding material; and opening the fixed mold and the movable mold to retrieve the optical component.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 12A, 12B, 12C, 12D, 12E and 12F are six views of the optical component according to the first example of the present invention;

FIGS. 15A, 15B, 15C, 15D, 15E and 15F are six views of the optical component according to the second example of the present invention;

FIGS. 18A, 18B, 18C, 18D, 18E and 18F are six views of the optical component according to the third example of the present invention;

MODE FOR CARRYING OUT THE INVENTION

Figure 1A:
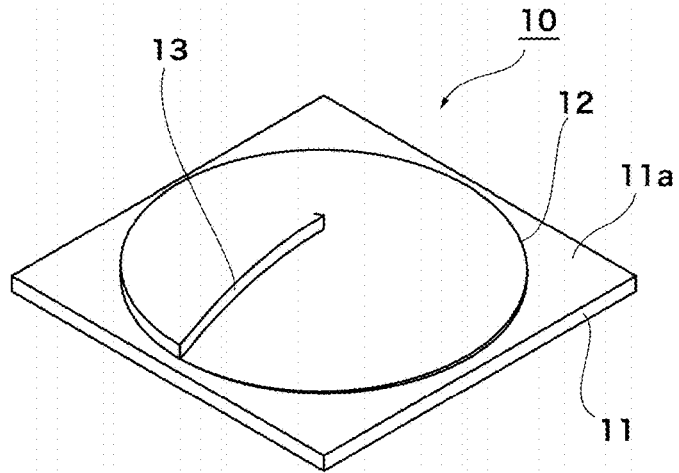
FIGS. 1A and 1B show an optical component according to an embodiment of the present invention.

A description will now be given of an optical component according to an embodiment of the present invention. This optical component is an optical component that includes a vortex profile. Identical or like constituting elements, members, processes shown in the drawings are represented by identical symbols and a duplicate description will be omitted. The preferred embodiments are not intended to limit the scope of the invention but exemplify the invention. Not all of the features and the combinations thereof described in the embodiments are necessarily essential to the invention.

Figure 1B:
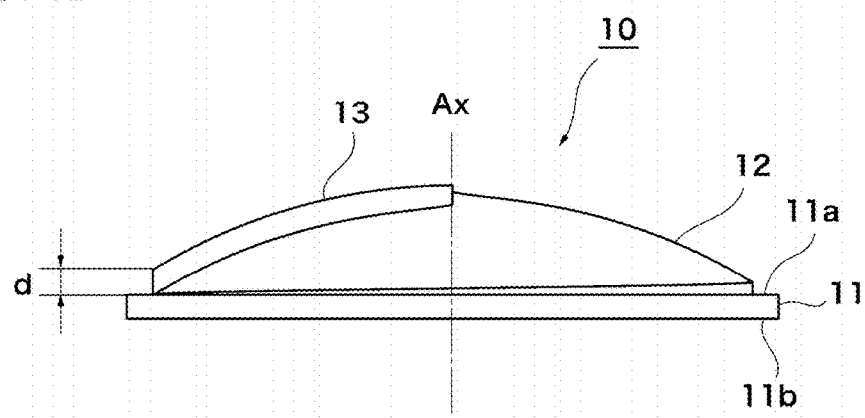

FIGS. 1A and 1B show an optical component 10 according to an embodiment of the present invention. FIG. 1A is a perspective view of the optical component 10, and FIG. 1B is a side view of the optical component 10. As shown in FIGS. 1A and 1B, the optical component 10 includes a lens 12 formed on a substrate 11.

The substrate 11 is a plate member that includes a first principal surface 11a and a second principal surface 11b opposite to the first principal surface 11a. For example, resin or glass can be used as a material for forming the substrate 11.

The lens 12 is formed on the first principal surface 11a of the substrate 11. The lens 12 shown in FIGS. 1A and 1B is a spherical convex lens, but the lens can be a spherical concave lens, an aspherical convex lens, an aspherical concave lens, etc.

A vortex profile 13 is formed on the surface of the lens 12 of the optical component 10 according to the embodiment. Hereinafter, the lens in which a vortex profile is formed on the surface of the lens will be referred to as a "vortex-on-lens". The vortex profile 13 is a spiral optical element formed continuously or in steps around the light axis and has the function of generating an optical vortex, i.e., transforming the incident light into a light having a phase difference in the circumferential direction. The vortex profile 13 transforms the incident light into a light having a phase difference in the circumferential direction. A light having a ring-shaped light intensity distribution is thus obtained.

As shown in FIG. 1B, the vortex profile 13 has a maximum step difference d. The step difference d represents a difference between the highest part and the lowest part of the vortex profile 13. The phase difference $\Delta\Phi$ is given by $\Delta\Phi = 2\pi \times m_c \times \Delta n \times d / \lambda$, where $m_c$ denotes the charge representing the number of repetitions (the number of cycles), in the vortex profile 13, of shapes having the step difference d per one circle, and $\lambda$ denotes the wavelength used. $\Delta n$ denotes a refractive index difference between the material forming the vortex profile and the surrounding medium at the wavelength $\lambda$ used. Any of various types of the vortex profile 13 may be used depending on the phase difference that should be provided. For example, a profile that provides a phase difference of $2\pi$ in one circle (the charge $m_c=1$, the phase difference $\Delta\Phi=2\pi$), a profile that provides a phase difference continuously through 360°, a profile that provides a phase difference of $2\pi$ per 180° ($m_c=2$, $\Delta\Phi=2\pi \times 2$), a profile that provides a phase difference of $2\pi$ per 120° ($m_c=3$, $\Delta\Phi=2\pi \times 3$), or the like may be used. When the phase difference $\Delta\Phi$ is $2\pi \times m$ (m is an integer), a light beam having a ring-shaped light intensity distribution with the highest axial symmetry around the central axis is obtained.

The lens 12 and the vortex profile 13 are arranged such that their light axes thereof are aligned (as shown in FIG. 1B, the aligned light axis shall be represented as a light axis Ax of the optical component 10).

Figure 2:
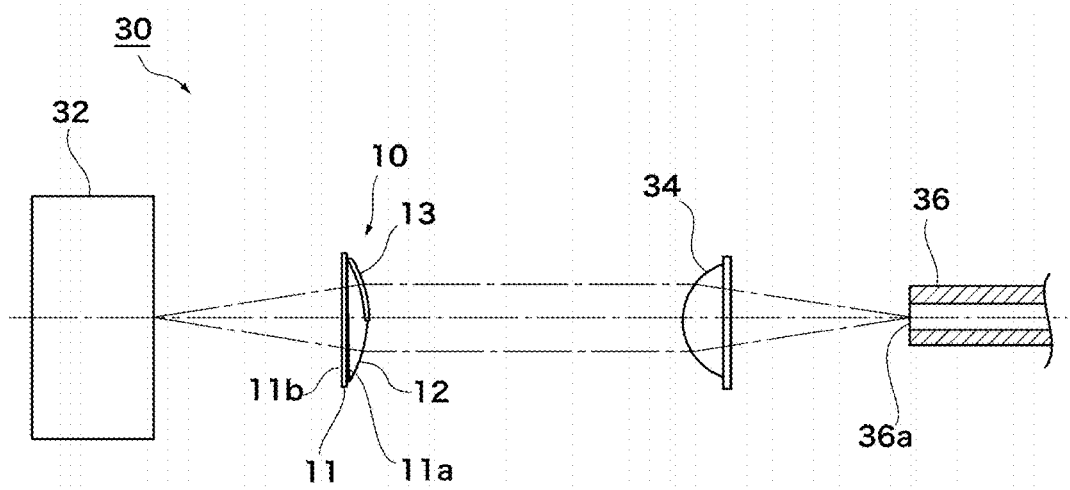
FIG. 2 shows a schematic configuration of an optical module in which the optical component according to the embodiment is used.

FIG. 2 shows a schematic configuration of an optical module 30 in which the optical component 10 according to the embodiment is used. As shown in FIG. 2, the optical module 30 is provided with a light source 32, the optical component 10, a condensing lens 34, and a multimode fiber 36. FIG. 2 shows how the light emitted from the light source 32 is incident on a core 36a of the multimode fiber 36 via the optical component 10 and the condensing lens 34.

A surface-emitting laser such as a VCSEL or an edge-emitting laser diode can be used as the light source 32. For example, the optical component 10 is arranged such that the second principal surface 11b of the substrate 11, on which a lens is not formed, is the incidence surface that receives the light from the light source 32, but the configuration of the optical component 10 is not limited to this. The light incident on the optical component 10 is turned into a parallel light by the lens 12 and transformed into a light having a spirally rotating wavefront and a ring-shaped light intensity distribution. The parallel light output from the optical component 10 and having a ring-shaped light intensity distribution is condensed by the condensing lens 34 provided to face the optical component 10 and is incident on the core 36a of the multimode fiber 36. FIG. 2 shows an exemplary embodiment, and an equivalent function can be realized by other configurations. For example, the first principal surface 11a of the optical component 10 on which the lens 12 is formed may face the light source 32. Alternatively, the optical component 10 and the condensing lens 34 may be replaced.

Figure 3A:
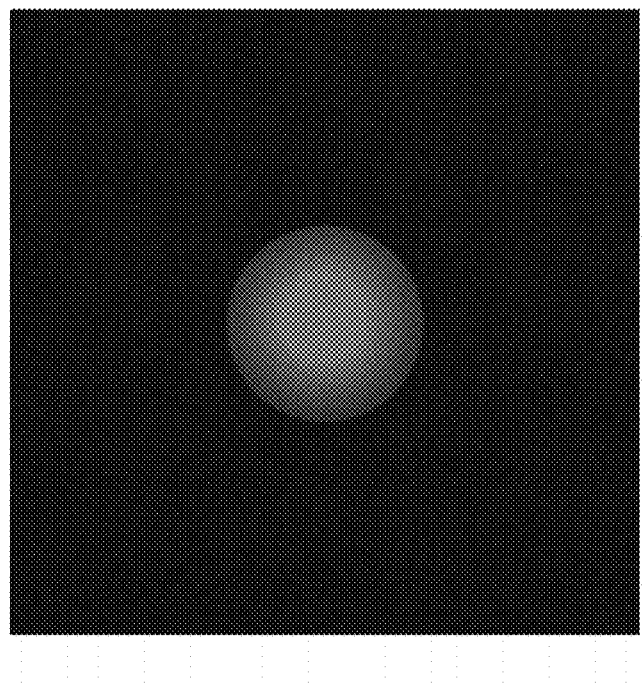
FIGS. 3A and 3B show intensity distributions of the light incident on a multimode fiber.
Figure 3B:
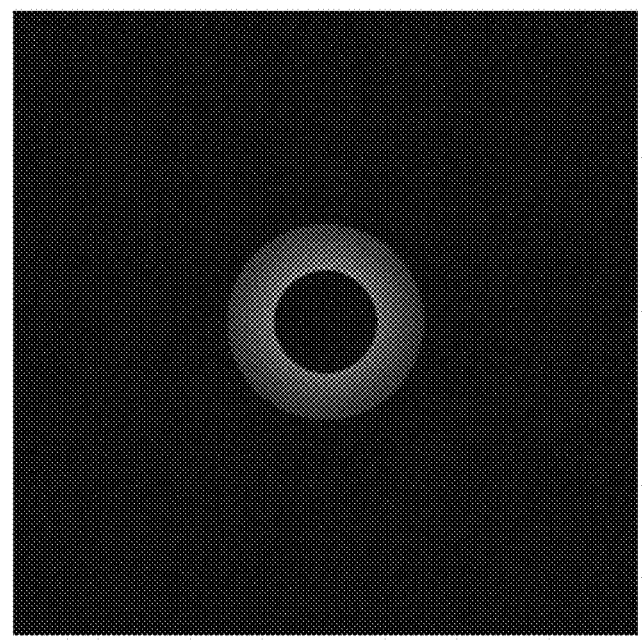

FIGS. 3A and 3B show intensity distributions of the light incident on a multimode fiber. FIG. 3A shows a comparative example and shows an intensity distribution of the light incident on the multimode fiber that results when a mere collimating lens is provided in the optical module 30 shown in FIG. 2 in place of the optical component 10. FIG. 3B shows an intensity distribution of the light incident on the multimode fiber that results when the optical component 10 according to the embodiment is used.

A comparison between FIGS. 3A and 3B reveals that a light having a ring-shaped intensity distribution in which the intensity at the center is lowered can be caused to be incident on the core 36a of the multimode fiber 36 by using the optical component 10 according to the embodiment. This eliminates light incident on the central part of the core 36a, where the refractive index may be unstable. Accordingly, DMD is inhibited, and the optical transmission performance of the optical module 30 is improved as a result.

In the case the vortex phase plate and the two other lenses (i.e., the collimating lens and the condensing lens) are formed as separate components and the components as combined are used in the optical module, it is necessary to fix the vortex phase plate and the other lenses such that their light axes are aligned. As will be obvious, however, adjustment of light axes will be difficult as the number of optical components is increased. By integrating the vortex profile 13 on the surface of the lens 12 and integrating the lens 12 and the vortex profile 13, the optical component 10 can be dealt with as if it is a single ordinary lens. Since it only requires aligning the light axes of the two components, i.e., the optical component 10 and the condensing lens 34, light axis adjustment will be easier as compared with the case of adjusting the light axes of the vortex phase plate and two other lenses. This will provide even greater advantage when an optical component with a plurality of arrayed optical components stacked are dealt with.

An antireflection layer may be formed on the surface of the optical component 10 according to the embodiment exposed to a medium external to the optical component (e.g., air), i.e., the first principal surface 11a (the lens 12, the vortex profile 13) and the second principal surface 11b in order to suppress reflection loss. The antireflection layer may be formed by a dielectric multilayer film, a microstructure having a period of 10-1000 nanometers, a matching layer having a refractive index intermediate between the refractive index of the external medium and the refractive index of the optical device, or the like.

Figure 4:
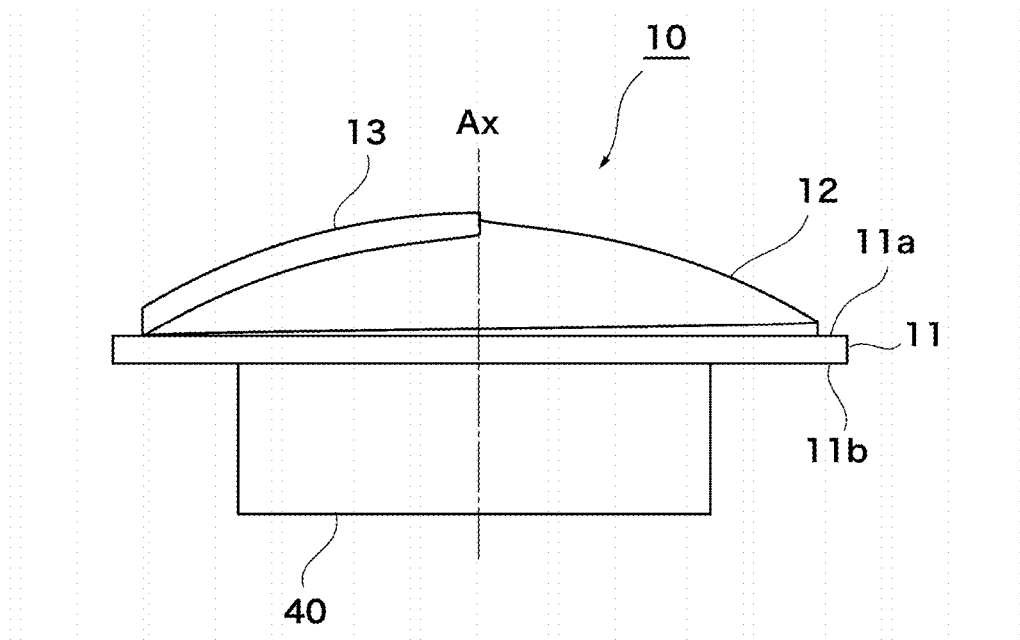
FIG. 4 shows an embodiment in which an optical device is combined with the optical component.

FIG. 4 shows an embodiment in which an optical device 40 is combined with the optical component 10. In the optical component 10 according to the embodiment, the second principal surface 11b of the substrate 11 is formed in a planar shape. Therefore, the optical device 40 can be provided on the second principal surface 11b as desired. The optical device 40 provided on the second principal surface 11b may be a lens, a polarizer, a wavelength plate, a phase plate, a prism, a diffraction grating, a filter, a mirror, a half mirror, a light emitting device, a light receiving device, or the like. The planar shape of the second principal surface 11b is also advantageous in that an electrode, a metal wiring, or the like may be formed on the surface before mounting a light emitting device, a light receiving device, or the like. By providing the optical device 40 on the second principal surface 11b, the space required for the optical module is reduced more successfully than when the optical device 40 and the optical component 10 are provided separately and at a distance. Since the optical device 40 is directly fixed to the optical component 10, there is an added advantage in that light axis adjustment of the optical device 40 and the optical component 10 is easy and a shift between the light axes is unlikely to occur once the device is fixed.

Figure 5:
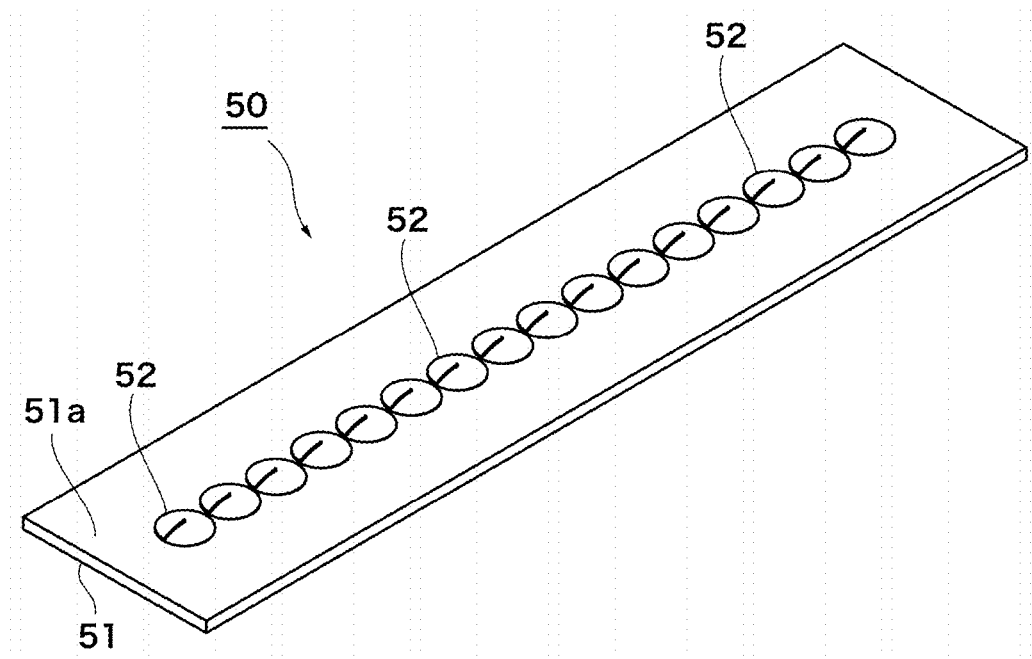
FIG. 5 is a perspective view showing an optical component according to another embodiment of the present invention.

FIG. 5 is a perspective view showing an optical component 50 according to another embodiment of the present invention. The optical component 50 shown in FIG. 5 is a lens array in which an array of a plurality of vortex-on-lenses 52 is arranged on a first principal surface 51a of a substrate 51.

The embodiment shown in FIG. 2 is a case where light is incident on a single multimode fiber 36. In the case a plurality of multimode fibers 36 are arranged for spatial multiplexing, an array of the optical component 50 and the condensing lens 34 (see FIG. 2) as shown in FIG. 5 are used. This only requires adjusting the optical axes of the optical component 50 with an array of a plurality of vortex-on-lenses 52 and an array of the condensing lens 34 and so makes light axis adjustment far easier than the case of adjusting the light axes of the vortex profile in an array pattern and the two other lens arrays.

A description will now be given of a method of manufacturing the optical component described above. Two representative manufacturing methods will be explained.

(1) Photo Polymerization (2P) Molding 2P molding is ultraviolet-cured molding and is a molding method in which a mold having an optically designed shape is filled with an ultraviolet curable resin and is stacked to a plate of glass, acryl, or the like as a substrate, the resin is cured by ultraviolet irradiation, and then the assembly is demolded to transfer the inverted shape of the mold onto the substrate. A description will be given of a case where a glass substrate is used in 2P molding to form the optical component 50 including a vortex-on-lens provided in an array pattern.

Methods to fabricate a mold for molding the optical component 50 include a method of fabricating the mold by mechanically working a mold base and a method of fabricating the mold in a photoconductor such as a photosensitizing agent and a photoresist by photolithography.

Figure 6:
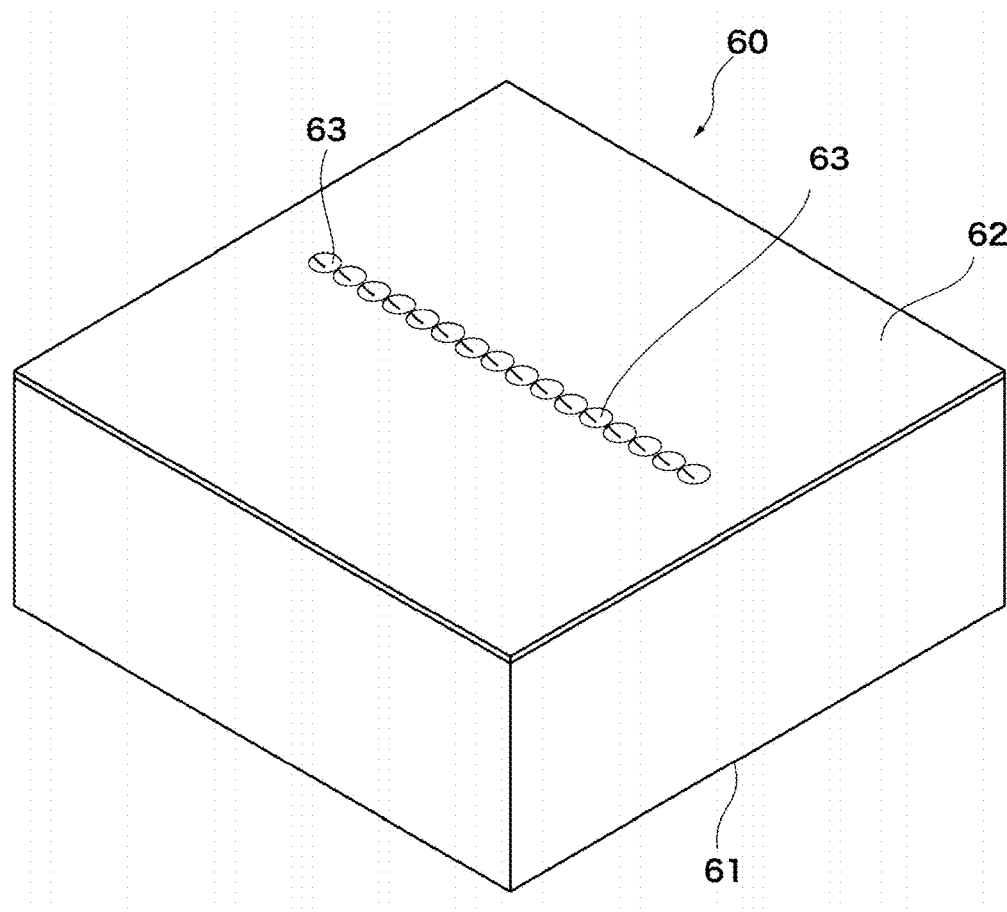
FIG. 6 is a schematic perspective view of a master mold fabricated by a mechanical work.
Figure 7:
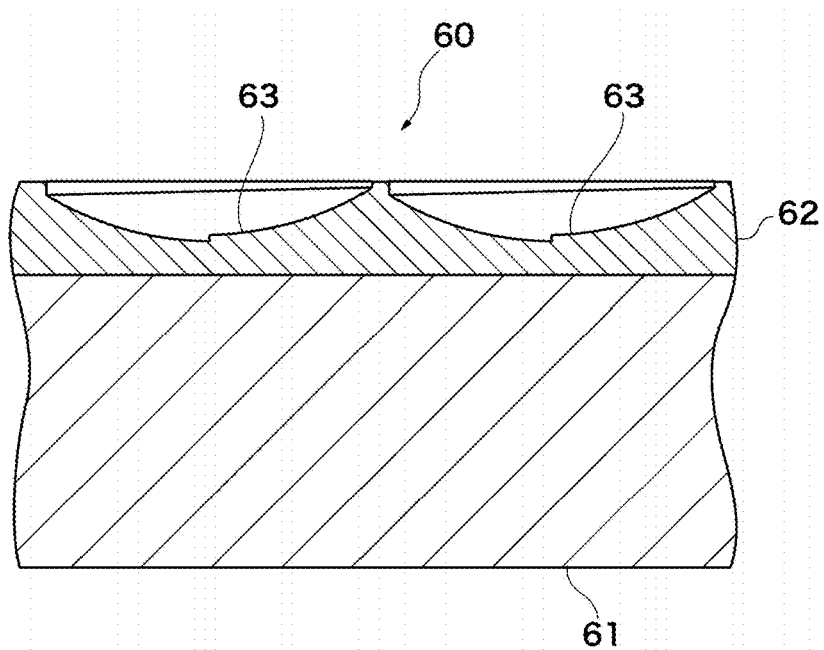
FIG. 7 is a schematic partial cross-sectional view of the master mold fabricated by a mechanical work.

FIG. 6 is a schematic perspective view of a master mold 60 fabricated by a mechanical work. FIG. 7 is a schematic partial cross-sectional view of the master mold 60 fabricated by a mechanical work. For example, the master mold 60 may be fabricated by a mechanical work by using an ultraprecision cutting tool of an ultra-nanofabrication machine to work a mold base, produced by applying electroless nickel phosphorous plating 62 on the surface of a stainless steel member 61, to form an inverted shape 63 of the vortex-on-lens.

The master mold for the vortex-on-lens is designed based on a specification that uses a refractive index of 1.6 (wavelength of 850 nm) of the ultraviolet curable resin material used to form a lens and turns the light emitted from a surface emitting laser (VCSEL) at a radiation angle 20° into a parallel light. More specifically, the master mold is designed to arrange 16 vortex-on-lenses at a pitch of 0.25 mm, each vortex-on-lens being based on an axially symmetrical aspherical shape of a lens diameter=φ0.24 mm and a lens height (sag)=0.033 mm, and a step difference shape of a step difference d=0.009 mm being provided on the base aspherical shape. The vortex profile is designed to induce a phase difference of $\Delta\Phi=2\pi\times6$ so that an optical vortex of an orbital angular momentum can be suitable for optical connection with the multimode fiber.

Figure 8A:
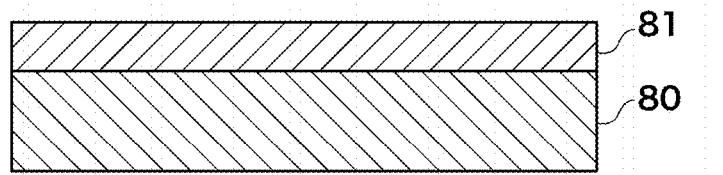
FIGS. 8A, 8B, 8C, 8D and 8E show the steps of fabricating a master mold by photolithography.
Figure 8B:
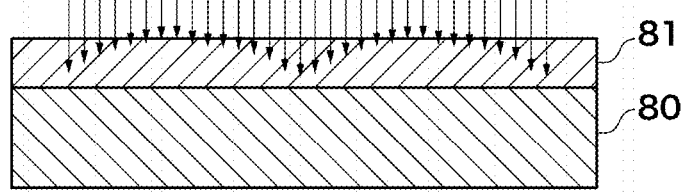
Figure 8C:
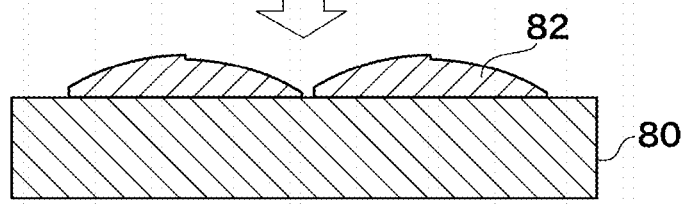
Figure 8D:
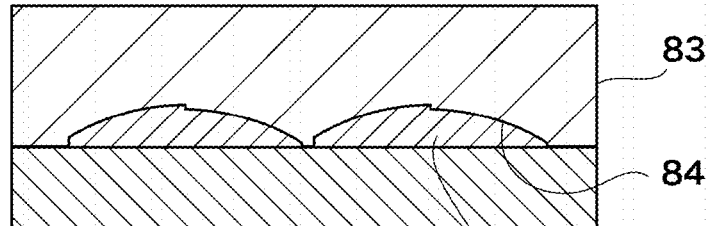
Figure 8E:
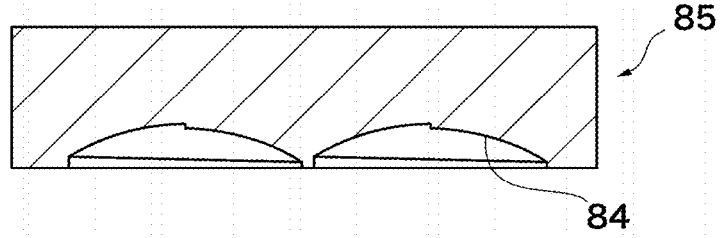

FIGS. 8A, 8B, 8C, 8D and 8E show the steps of fabricating a master mold by photolithography. First, a substrate (e.g., silicon wafer) 80 as shown in FIG. 8A is coated with a photoresist 81. Subsequently, as shown in FIG. 8B, the photoresist 81 is exposed by a direct laser lithographic apparatus in the shape of a vortex-on-lens. Subsequently, as shown in FIG. 8C, the photoresist is developed by a developing liquid to form a shape 82 of the vortex-on-lens. As shown in FIG. 8D, an inverted shape 84 of the vortex-on-lens is transferred by a Ni plating 83 from the shape 82 of the vortex-on-lens fabricated by the photoresist. Subsequently, the assembly is demolded as shown in FIG. 8E, and a master mold (Ni electroforming stamper) 85 is obtained.

The master mold fabricated as described above can be used as a mold for 2P molding. However, a metal master mold cannot transmit ultraviolet rays and so imposes a restriction that makes it necessary to use an ultraviolet-transmissive material for the 2P molding substrate. It is therefore desired to form a replica mold on a glass substrate by 2P molding and use the replica mold as a mold for 2P molding. The approach also prevents handling damage and so is desired from the perspective of protecting the master mold.

The ultraviolet curable resin used to fabricate a replica mold need not be the same as the ultraviolet curable resin used to mold the optical component of the present invention. An ultraviolet curable resin having excellent repetitive transferability or shape (dimension) stability (e.g., showing low cure shrinkage) is used for a replica mold.

Figure 9A:
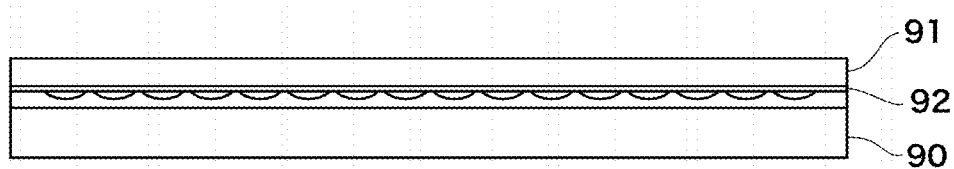
FIGS. 9A, 9B, 9C and 9D show the steps of fabricating a replica mold.
Figure 9B:
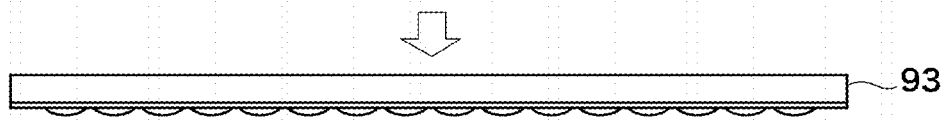
Figure 9C:
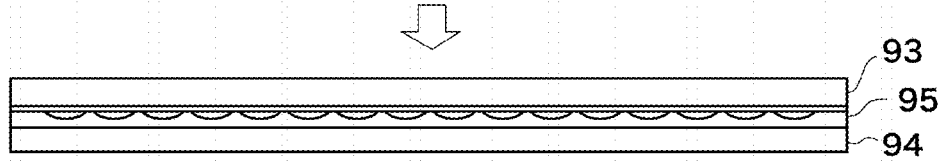
Figure 9D:
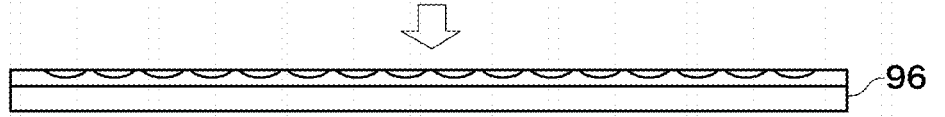

FIGS. 9A, 9B, 9C and 9D show the steps of fabricating a replica mold. First, as shown in FIG. 9A, a master mold 90 in which the inverted lens shape (concave shape) of the vortex-on-lens is formed is used. A convex-shaped replica mold is formed by 2P molding on a glass substrate 91, using an ultraviolet curable resin 92. FIG. 9B shows a convex-shaped replica mold 93 as completed. Subsequently, as shown in FIG. 9C, the convex-shaped replica mold 93 is used to form a concave-shaped replica mold by 2P molding on a glass substrate 94, using an ultraviolet curable resin 95. FIG. 9D shows a concave-shaped replica mold 96 as completed.

It is desired that the master mold 90 and the replica mold 96 be coated with a mold release agent to facilitate demolding after the ultraviolet curable resin has cured. The release agent is diluted by a fluorine-based coating agent to 0.1%. The mold is spin-coated or dip-coated with the agent and maintained for 1 hour or more in a high-temperature, high-humidity atmosphere of about 60° C. and 90% RH to complete the coating step.

In the embodiment described above, a glass substrate is used as a base substrate of the replica mold and a substrate of the optical component fabricated from the replica mold. The glass substrate may be transparent at the wavelength used (e.g., 850 nm). Soda lime glass, borosilicate glass, or alkali-free glass that does not contain an alkali metal element substantially can be used. It is desired that the glass surface be treated with a silane coupling agent to improve adhesion (strength of bonding) to the ultraviolet curable resin for molding the vortex profile. For surface treatment, the glass substrate is subjected to surface activation such as UV ozone cleaning, corona discharge treatment, and plasma treatment and is spin-coated with a silane coupling agent (aminosilane) diluted to 0.1% and dried for 10 minutes at 120° C.

Figure 10A:
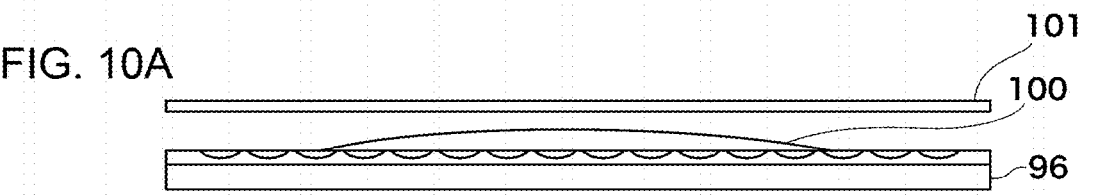
FIGS. 10A, 10B, 10C and 10D show the steps of fabricating the optical component by 2P molding.

FIGS. 10A, 10B, 10C and 10D show the steps of fabricating the optical component by 2P molding. First, as shown in FIG. 10A, the replica mold 96 for molding a vortex-on-lens is prepared, and an ultraviolet curable resin 100 is dropped onto the replica mold 96. The ultraviolet curable resin 100 may be an epoxy-based ultraviolet curable resin having a refractive index of 1.6 (wavelength of 850 nm) and an optical transmittance of 90% after curing.

Figure 10B:
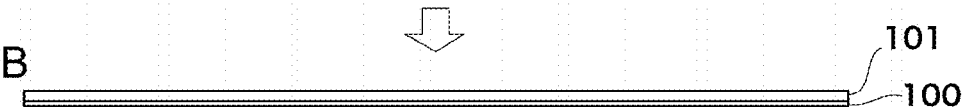

As shown in FIG. 10B, a glass substrate 101 is stacked to the replica mold 96, and the ultraviolet curable resin 100 is spread as far as a target resin spreading area.

Figure 10C:
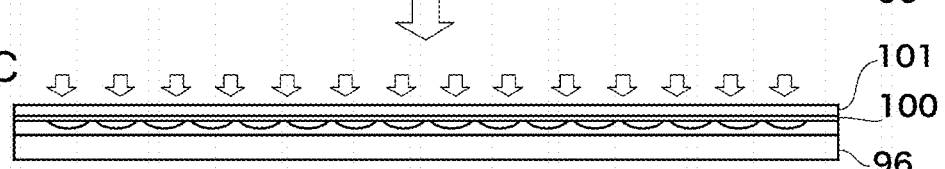
Figure 10D:
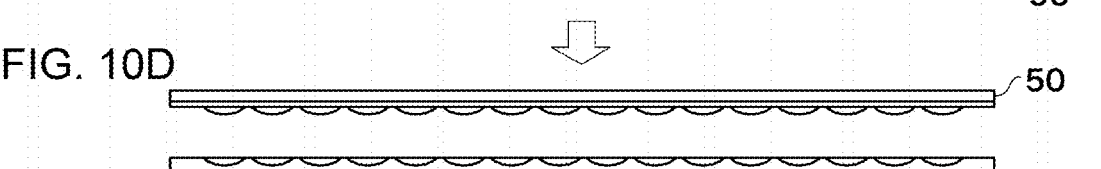

As shown in FIG. 10C, the ultraviolet curable resin 100 is then irradiated with ultraviolet rays via the glass substrate 101 to cure the ultraviolet curable resin 100. The condition for curing may be such that the ultraviolet rays having a wavelength of 360 nm and an irradiation energy of 500 J/cm$^2$ (for example, the resin may be irradiated with ultraviolet rays having an irradiation intensity of 10 mW/cm$^2$ for an irradiation time of 50 seconds). After the ultraviolet curable resin 100 is cured, the replica mold 96 is demolded as shown in FIG. 10D to obtain the optical component 50.

(2) Injection Molding

A description will now be given of injection molding. The description here also shows a case of forming the optical component 50 provided with vortex-on-lenses arranged in an array pattern.

The mold (piece) for the vortex-on-lens is designed so that the lens formed by the mold have the function of turning the light emitted from a surface emitting laser (VCSEL) at a radiation angle 20° into a parallel light when the resin used to mold the optical component 50 has a refractive index of 1.52 (wavelength of 850 nm). More specifically, the mold is designed to arrange 16 vortex-on-lenses at a pitch of 0.25 mm, each vortex-on-lens being based on an axially symmetrical aspherical shape of a lens diameter=φ0.24 mm and a lens height (sag)=0.035 mm, and a step difference shape of a step difference d=0.01 mm being provided on the base aspherical shape. The vortex profile is designed to shift a phase over six cycles so that an optical vortex of an orbital angular momentum suitable for optical connection with the multimode fiber.

As in the case of 2P molding described above, the mold of the vortex-on-lens built into an injection mold may be fabricated by mechanically working a mold base or fabricated in a photoconductor such as a photosensitizing agent and a photoresist by photolithography. In the case of the photolithographic method, the Ni electroforming stamper described with reference to FIGS. 8A, 8B, 8C, 8D and 8E is backed by a stainless steel member to fabricate a mold to be built into the injection mold.

Figure 11A:
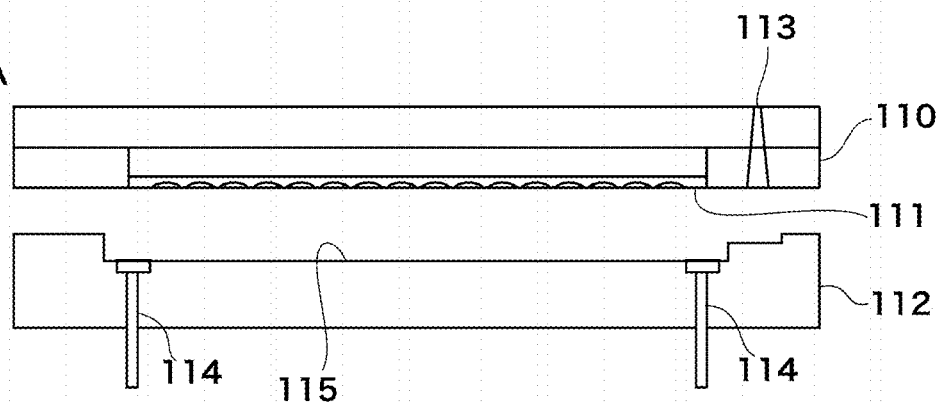
FIGS. 11A, 11B and 11C show the steps of fabricating the optical component by injection molding.
Figure 11B:
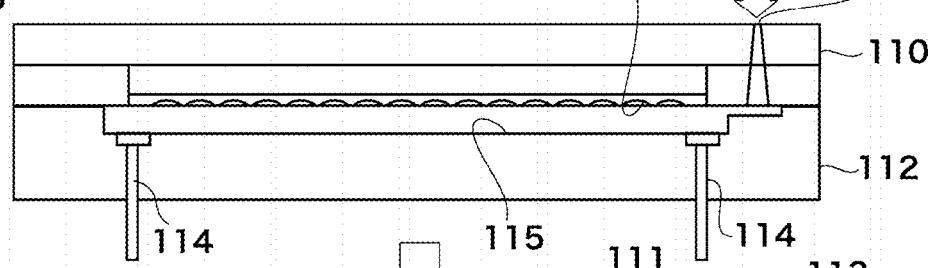
Figure 11C:
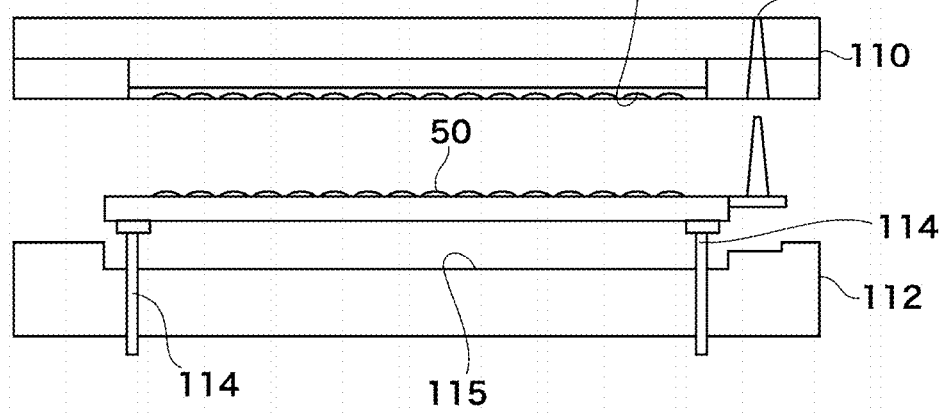

FIGS. 11A, 11B and 11C show the steps of fabricating the optical component by injection molding. As shown in FIG. 11A, a mold 111 of the vortex-on-lens is mounted in a cavity of a fixed mold 110, and a movable mold 112 is provided to face the fixed mold 110.

Subsequently, as shown in FIG. 11B, the fixed mold 110 and the movable mold 112 are closed. An injection unit (not shown) that comes with the injection molding machine is used to inject a molding material (resin) to a space 115 between the fixed mold 110 and the movable mold 112 via a resin injection port (sprue) 113. For example, the molding material may be cycloolefin polymer. To prevent the molded product from being colored, it is desired to, for example, pre-heat the molding material for four hours at 100° C. to remove dissolved air.

After the molded product is cooled and cured, the mold is opened by removing the movable mold 112 from the fixed mold 110. By extruding the molded product from the movable mold 112 by using an extrusion pin 114, the optical component 50 according to the embodiment is obtained. The molding condition is such that the mold clamping force is 15 ton, the mold temperature=100° C., the resin temperature=260° C., the injection time is 1.5 seconds, the holding pressure×time=10 MPa×1 second, and the cooling time is 10 seconds.

As described above, the optical component (lens array) according to the embodiment controls the direction and light intensity distribution of the light incident from the light source. By forming a vortex profile on the lens surface to integrate the lens and the vortex profile, light axis adjustment is easier as compared with the case where these are separate components. The optical component is transparent as a whole.

FIGS. 12A, 12B, 12C, 12D, 12E and 12F are six views of the optical component (lens array) according to the first example of the present invention. The optical component (substrate) is dimensioned to be 1.00 mm vertically×4.50 mm horizontally×0.01 mm high. In the first example, the plurality of lenses are arranged such that each line representing the step difference of the vortex profile (the line extending from the lens apex in the radial direction) is parallel to the direction of lens arrangement. FIG. 12A is a rear view of the optical component. FIG. 12B is a plan view of the optical component. FIG. 12C is a front view of the optical component. FIG. 12D is a bottom view of the optical component. FIG. 12E is a left side view of the optical component. FIG. 12F is a right side view of the optical component.

Figure 13A:
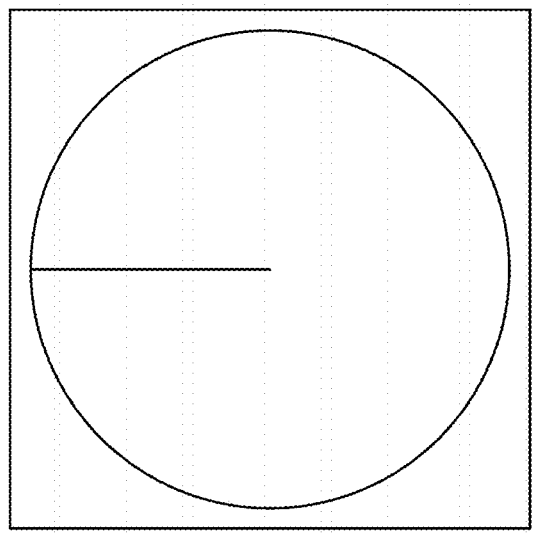
FIGS. 13A, 13B, 13C, 13D and 13E are enlarged views of the A-B portion of the optical component shown in FIGS. 12A, 12B, 12C, 12D, 12E and 12F.
Figure 13B:
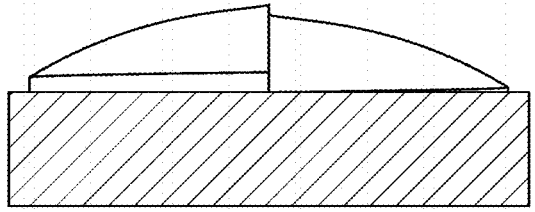
Figure 13D:
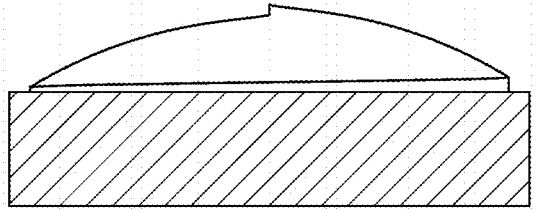
Figure 13C:
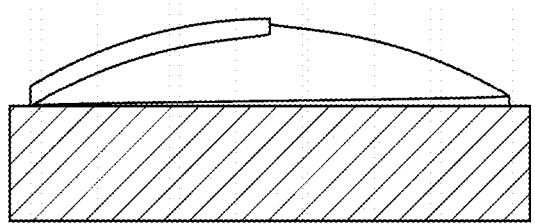
Figure 13E:
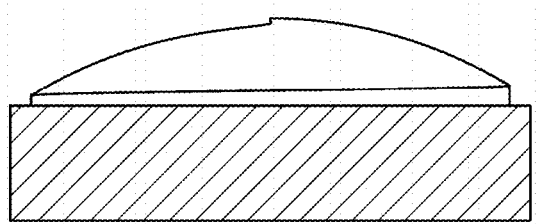

FIGS. 13A, 13B, 13C, 13D and 13E are enlarged views of the A-B portion of the optical component shown in FIGS. 12A, 12B, 12C, 12D, 12E and 12F. FIG. 13A is an enlarged plan view of the A-B portion of the optical component. FIG. 13B is an enlarged left side view of the A-B portion of the optical component. FIG. 13C is an enlarged front view of the A-B portion of the optical component. FIG. 13D is an enlarged right side view of the A-B portion of the optical component. FIG. 13E is an enlarged rear view of the A-B portion of the optical component.

Figure 14A:
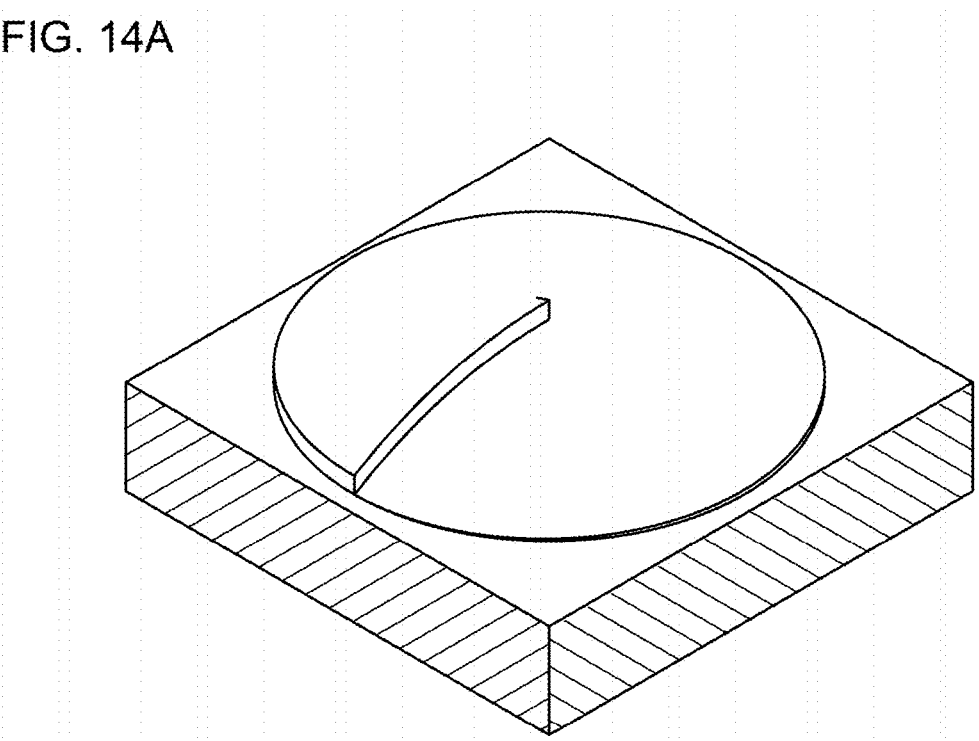
FIGS. 14A and 14B are enlarged perspective views of the A-B portion of the optical component shown in FIGS. 12A, 12B, 12C, 12D, 12E and 12F.
Figure 14B:
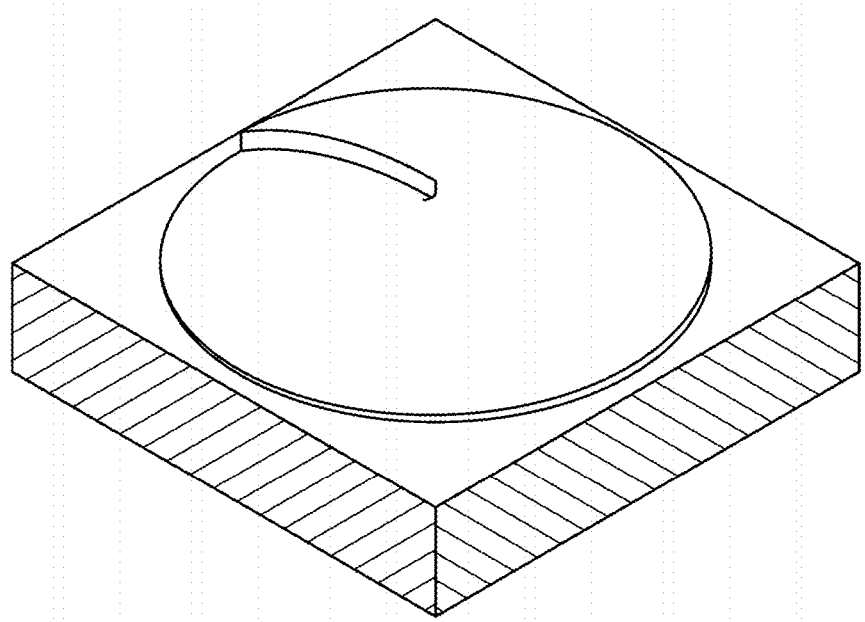

FIGS. 14A and 14B are enlarged perspective views of the A-B portion of the optical component shown in FIGS. 12A, 12B, 12C, 12D, 12E and 12F.

FIGS. 15A, 15B, 15C, 15D, 15E and 15F are six views of the optical component (lens array) according to the second example of the present invention. In the second example, the plurality of lenses are arranged such that each line representing the step difference of the vortex profile (the line extending from the lens apex in the radial direction) is inclined by 45° with respect to the direction of lens arrangement. FIG. 15A is a rear view of the optical component. FIG. 15B is a plan view of the optical component. FIG. 15C is a front view of the optical component. FIG. 15D is a bottom view of the optical component. FIG. 15E is a left side view of the optical component. FIG. 15F is a right side view of the optical component.

Figure 16A:
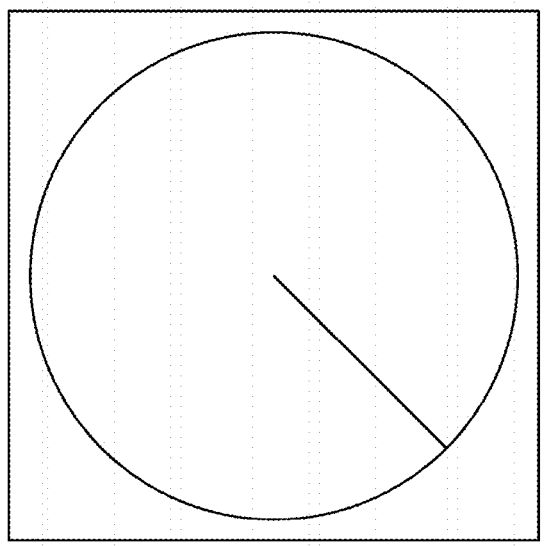
FIGS. 16A, 16B, 16C, 16D and 16E are enlarged views of the A-B portion of the optical component shown in FIGS. 15A, 15B, 15C, 15D, 15E and 15F.
Figure 16B:
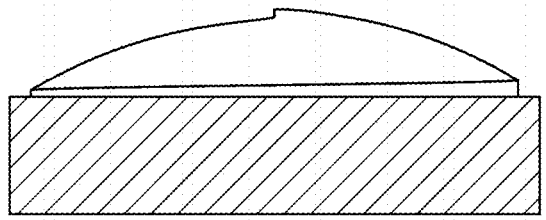
Figure 16D:
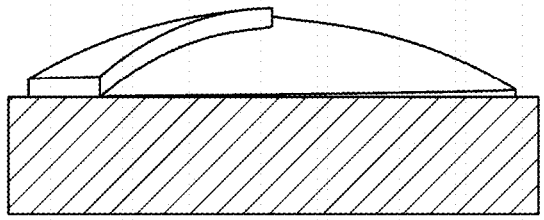
Figure 16C:
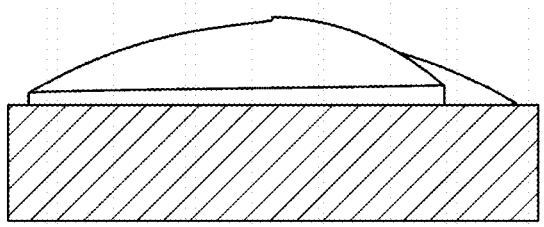
Figure 16E:
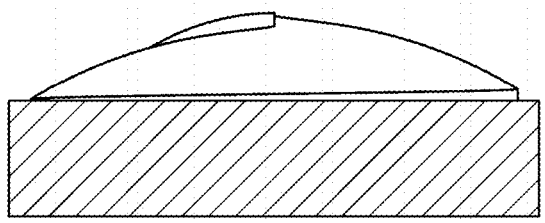

FIGS. 16A, 16B, 16C, 16D and 16E are enlarged views of the A-B portion of the optical component shown in FIGS. 15A, 15B, 15C, 15D, 15E and 15F. FIG. 16A is an enlarged plan view of the A-B portion of the optical component. FIG. 16B is an enlarged left side view of the A-B portion of the optical component. FIG. 16C is an enlarged front view of the A-B portion of the optical component. FIG. 16D is an enlarged right side view of the A-B portion of the optical component. FIG. 16E is an enlarged rear view of the A-B portion of the optical component.

Figure 17A:
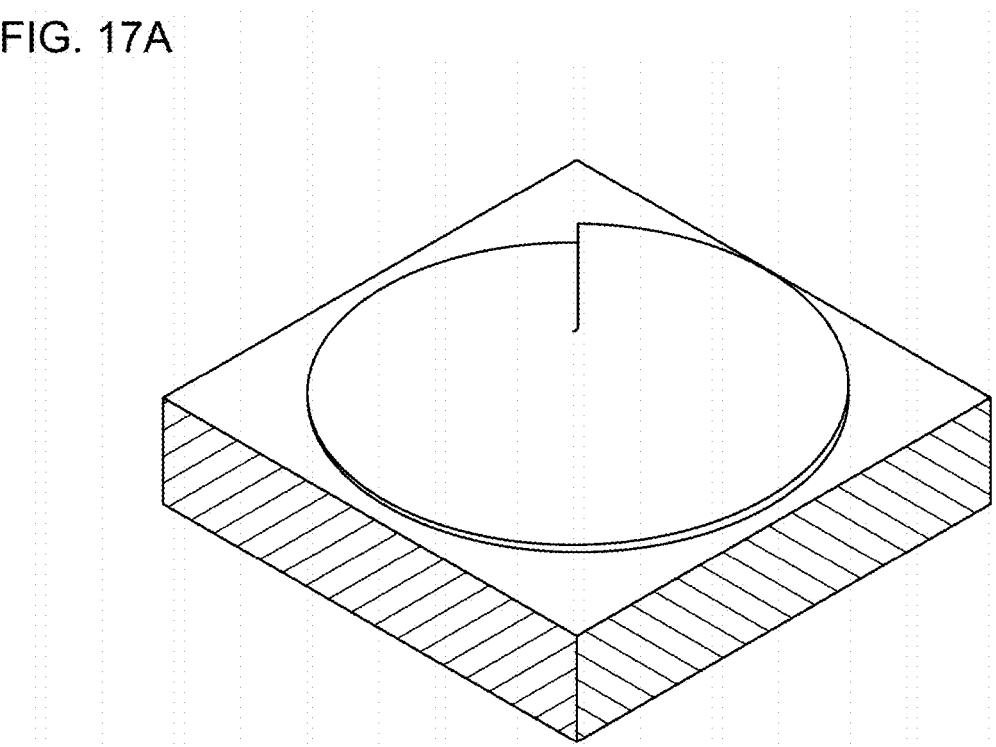
FIGS. 17A and 17B are enlarged perspective views of the A-B portion of the optical component shown in FIGS. 15A, 15B, 15C, 15D, 15E and 15F.
Figure 17B:
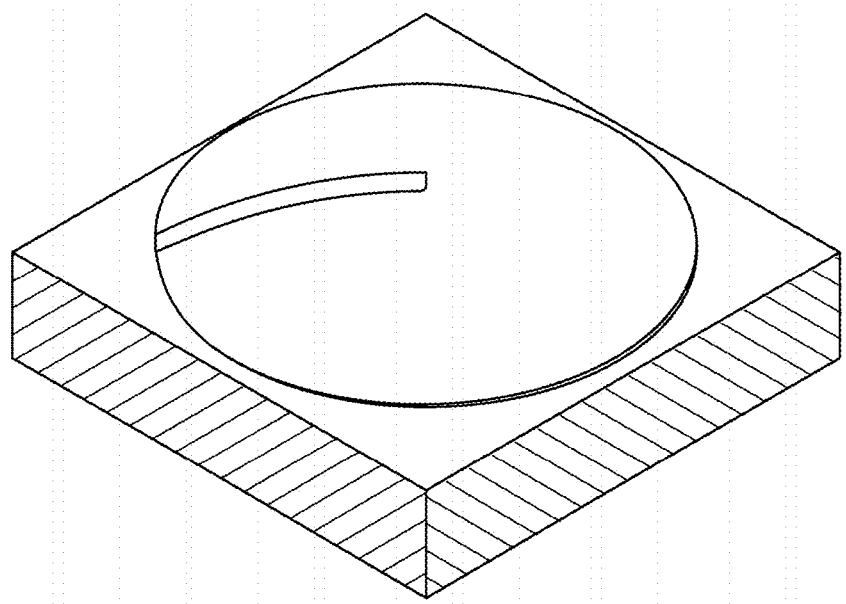

FIGS. 17A and 17B are enlarged perspective views of the A-B portion of the optical component shown in FIGS. 15A, 15B, 15C, 15D, 15E and 15F.

FIGS. 18A, 18B, 18C, 18D, 18E and 18F are six views of the optical component (lens array) according to the third example of the present invention. In the third example, the plurality of lenses are arranged such that each line representing the step difference of the vortex profile (the line extending from the lens apex in the radial direction) is orthogonal to the direction of lens arrangement. FIG. 18A is a rear view of the optical component. FIG. 18B is a plan view of the optical component. FIG. 18C is a front view of the optical component. FIG. 18D is a bottom view of the optical component. FIG. 18E is a left side view of the optical component. FIG. 18F is a right side view of the optical component.

Figure 19A:
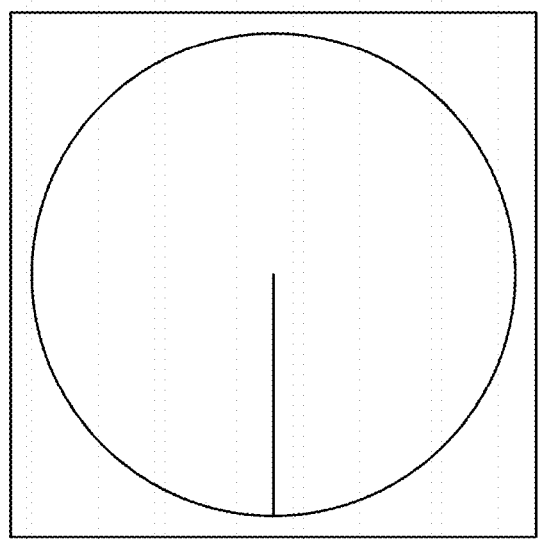
FIGS. 19A, 19B, 19C, 19D and 19E are enlarged views of the A-B portion of the optical component shown in FIGS. 18A, 18B, 18C, 18D, 18E and 18F.
Figure 19B:
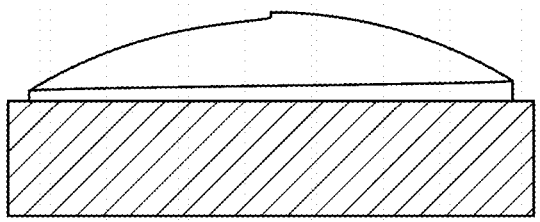
Figure 19D:
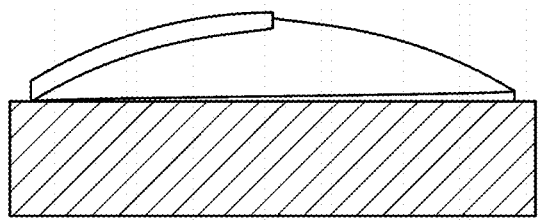
Figure 19C:
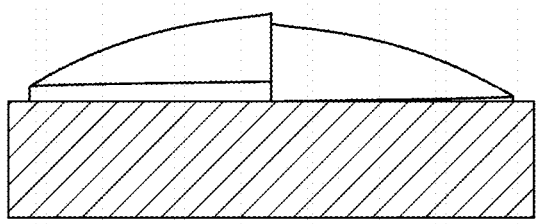
Figure 19E:
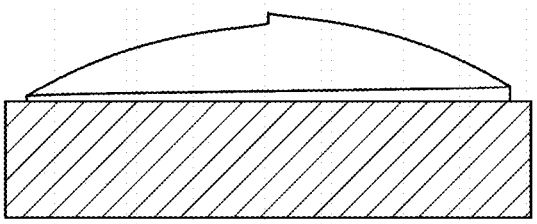

FIGS. 19A, 19B, 19C, 19D and 19E are enlarged views of the A-B portion of the optical component shown in FIGS. 18A, 18B, 18C, 18D, 18E and 18F. FIG. 19A is an enlarged plan view of the A-B portion of the optical component. FIG. 19B is an enlarged left side view of the A-B portion of the optical component. FIG. 19C is an enlarged front view of the A-B portion of the optical component. FIG. 19D is an enlarged right side view of the A-B portion of the optical component. FIG. 19E is an enlarged rear view of the A-B portion of the optical component.

Figure 20A:
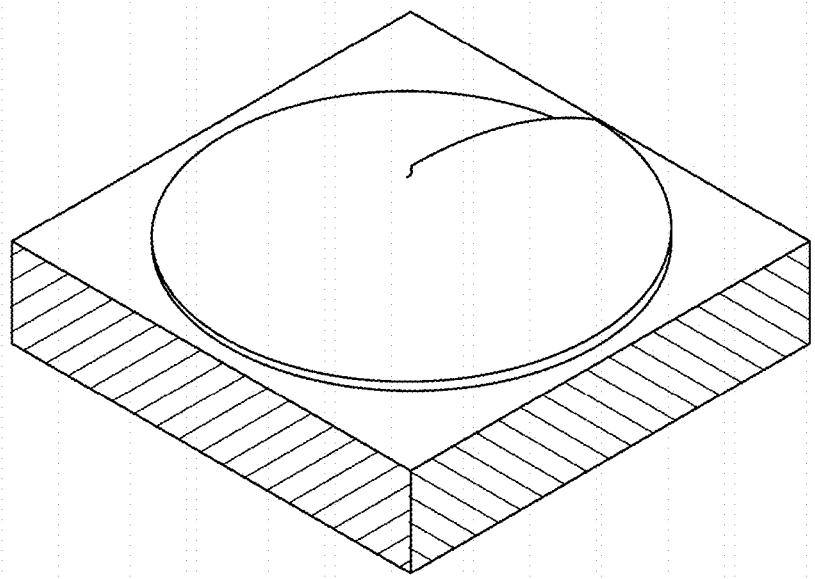
FIGS. 20A and 20B are enlarged perspective views of the A-B portion of the optical component shown in FIGS. 18A, 18B, 18C, 18D, 18E and 18F.
Figure 20B:
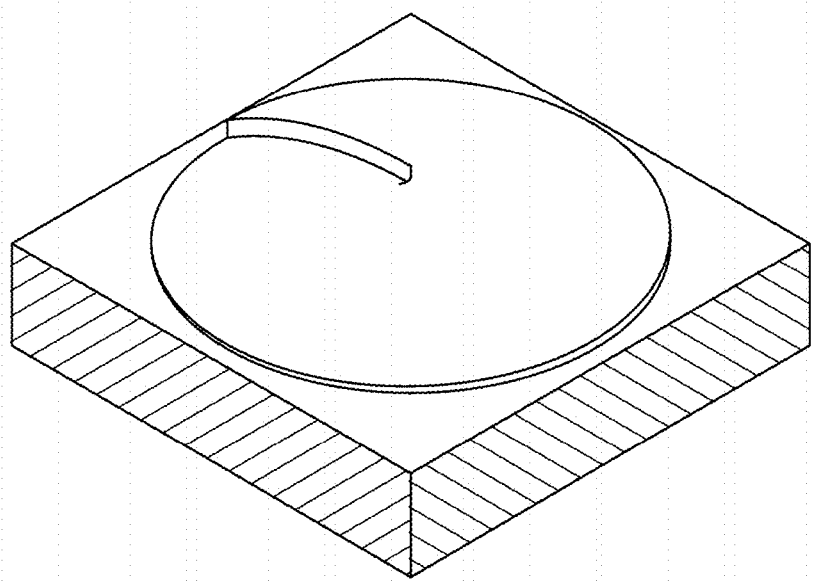

FIGS. 20A and 20B are enlarged perspective views of the A-B portion of the optical component shown in FIGS. 18A, 18B, 18C, 18D, 18E and 18F.

Given above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An optical component comprising:
    a substrate;
    an axially symmetrical lens formed on a first principal surface of the substrate; and
    a vortex profile formed on a surface of the lens,
    wherein the vortex profile has a maximum step difference d and includes a surface having a spiral profile formed in steps around an axis of the lens.

2. The optical component according to claim 1, further comprising:
    an optical device provided on a second principal surface of the substrate opposite to the first principal surface.

3. The optical component according to claim 2,
    wherein the optical device is at least one of a lens, a polarizer, a wavelength plate, a phase plate, a prism, a diffraction grating, a filter, a mirror, a half mirror, a light emitting device, and a light receiving device.

4. The optical component according to claim 3,
    wherein the optical device is a light emitting device or a light receiving device,
    wherein the second principal surface of the substrate is in a planar shape,
    wherein an electrode and a metal wiring are formed on the second principal surface, and
    wherein the light emitting device or the light receiving device is arranged on the second principal surface.

5. An optical module comprising:
    a light source;
    the optical component according to claim 2 that receives light from the light source;
    a condensing lens that condenses light from the optical component; and
    an optical fiber that transmits light from the condensing lens.

6. The optical component according to claim 1,
wherein a plurality of the lenses provided with the vortex profile are arranged on the first principal surface of the substrate in an array pattern.

7. A method of manufacturing the optical component according to claim 1, comprising:
dropping an photo-curable resin on a mold in which an inverted shape of the lens provided with the vortex profile is formed;
stacking the substrate to the mold and spreading the photo-curable resin;
irradiating the photo-curable resin with light to cure the photo-curable resin; and
demolding the mold to retrieve the optical component.

8. A method of manufacturing the optical component according to claim 1, comprising:
closing a fixed mold, on which a mold formed with an inverted shape of the lens provided with the vortex profile is mounted, and a movable mold, and then injecting a molding material into a space between the fixed mold and the movable mold;
cooling and curing the molding material; and
opening the fixed mold and the movable mold to retrieve the optical component.

9. The optical component according to claim 1,
wherein a light emitted from the optical component has a phase difference $\Delta\Phi$ in the circumferential direction, and
wherein the phase difference $\Delta\Phi$ is given by $\Delta\Phi = 2\pi \times m_c \times \Delta n \times d/\lambda$, where $m_c$ denotes the charge in the vortex profile, $\lambda$ denotes the wavelength used, and $\Delta n$ denotes a refractive index difference between a material forming the vortex profile and the surrounding medium.

10. An optical module comprising:
a light source;
the optical component according to claim 1 that receives light from the light source;
a condensing lens that condenses light from the optical component; and
an optical fiber that transmits light from the condensing lens.

* * * * *